United States Patent
Espenan et al.

(10) Patent No.: US 6,911,147 B2
(45) Date of Patent: Jun. 28, 2005

(54) WATER FILTERING MODULE WITH HOLLOW FIBERS

(75) Inventors: Jean-Michel Espenan, Deyme (FR); Franc Saux, Sainte Foy d'Aygrefeuille (FR)

(73) Assignee: Polymem, Fourquevaux (FR)

(*) Notice: Subject to any disclaimer, the term of this patent is extended or adjusted under 35 U.S.C. 154(b) by 33 days.

(21) Appl. No.: 10/168,074

(22) PCT Filed: Dec. 18, 2000

(86) PCT No.: PCT/FR00/03548

§ 371 (c)(1),
(2), (4) Date: Jun. 17, 2002

(87) PCT Pub. No.: WO01/43856

PCT Pub. Date: Jun. 21, 2001

(65) Prior Publication Data

US 2002/0189999 A1 Dec. 19, 2002

(30) Foreign Application Priority Data

Dec. 16, 1999 (FR) .............................. 99 15863

(51) Int. Cl.⁷ .............................................. B01D 65/08
(52) U.S. Cl. ........................... 210/321.69; 210/321.89; 210/500.23; 210/414
(58) Field of Search .................... 210/139, 321.6, 210/321.69, 321.78, 321.79, 321.8, 321.88, 321.89, 321.9, 321.72, 323.1, 323.2, 340, 410, 412, 483, 500.23, 414

(56) References Cited

U.S. PATENT DOCUMENTS 4,756,875 A 7/1988 Tajima et al.
5,783,083 A * 7/1998 Henshaw et al. ........... 210/636
6,126,819 A * 10/2000 Heine et al. ................ 210/139
6,156,200 A * 12/2000 Zha et al. ............... 210/321.89

FOREIGN PATENT DOCUMENTS

| EP | 0 855 214 | 7/1998 |
|----|-----------|--------|
| EP | 0 947 237 | 10/1999 |
| JP | 56 141801 | 11/1981 |
| JP | 04 197487 | 7/1992 |
| JP | 04 256424 | 9/1992 |
| JP | 08 290043 | 11/1996 |
| JP | 11 128692 | 5/1999 |
| WO | WO 96/07471 | 3/1996 |

OTHER PUBLICATIONS

English translation of JP–08–290043.*

* cited by examiner

*Primary Examiner*—W. L. Walker
*Assistant Examiner*—Krishnan S Menon
(74) *Attorney, Agent, or Firm*—Young & Thompson

(57) ABSTRACT

A module for ultrafiltration or microfiltration of water includes hollow fibers, of the type of filtration from outside inwards of the fibers, the water to be treated being introduced at the top of the module and the treated water being collected at the bottom of the module. The fibers are arranged inside a housing in multiple U-shaped bundles, the module being vertically arranged in use with the U-shape in the top part of the module. At the bottom of the module, each bundle is arranged in a sheath and individually potted. The sheaths are then urged to be housed in a distribution plate, and all the sheaths are interconnected by pouring (in reverse vertical position relative to that of the filtering mode) a potting resin.

16 Claims, 1 Drawing Sheet

US 6,911,147 B2

WATER FILTERING MODULE WITH HOLLOW FIBERS

BACKGROUND OF THE INVENTION

The method constituting the subject matter of the present invention is from the field of water filters. It relates more particularly to the field of ultrafiltration type membrane filters.

Modules including one or more bundles of hollow fibers stretched out parallel to each other and alongside each other and potted at both their ends are known in the art. With both ends potted and cut, the modules are used in external/internal filtration or vice-versa. Some are multi-bundle modules, the bundles being assembled with common potting of all the bundles. When they are used in external/internal filtration, air injection nozzles are disposed at the bottom of the peripheral bundles. The document EP-0 655 418 discloses an installation of this type.

Modules including one or more bundles of hollow fibers whose ends are potted at one end and free but closed individually at the other end are also known in the art. With one end potted, the fibers being plugged individually at the other end but not potted [sic]. The potted end is at the top in operation. These modules are used in external/internal filtration.

Modules including bundles of hollow fibers with the fibers disposed in a U-shape and bent at the bottom may also be cited.

Some modules use multiple bundles arranged in a casing, with a mechanical seal provided around the potting around the top of each bundle (generally by an O-ring). Air can be injected at the bottom of the module.

For all these types of modules, the bundles are either directly potted in a casing or demountable from the casing, the seal being provided by O-rings around the potting.

Bundles that are not housed in a pressure casing, but in a pool, the permeate being recovered by suction, are also used in the field of immersed membrane filters in particular. These modules generally use compressed air to agitate the bundles, whether this is with a vertical bundle potted at both ends, with air nozzles around the bundle, or with a horizontal bundle potted at both ends, the air being injected by auxiliary means at the bottom of the pool.

These various filters are complex and costly. They are also subject to problems of efficient operation, in particular of correct bubbling.

SUMMARY OF THE INVENTION

An object of the present invention is to provide a simple ultrafiltration or microfiltration module that preferably remedies these drawbacks.

To this end the invention is directed to a module for ultrafiltration or microfiltration of water, using hollow fibers, of the type with filtration from the exterior toward the interior of the fibers, water to be treated being introduced at the top of the module and treated water being collected at the bottom of the module, characterized in that the fibers are disposed inside a casing in multiple bundles in which the top portion of each fiber is free, the casing envelops the bundles to hold them in position, and, at the bottom of the module, each bundle is disposed in a sheath and potted individually, with the bundles then accommodated in a distribution plate.

The distribution plate can advantageously also be used to inject air into the module.

In a preferred embodiment of the invention the fibers are disposed inside a casing in multiple U-shaped bundles, with the branches of the U-shape disposed vertically in use with the base of the U-shape at the top of the module. Each bundle, and thus also each fiber, is therefore of inverted U-shape in use.

Clearly this enables a multi-bundle U-shape arrangement, with the base of the U-shape of the bundles at the top. It also provides efficient bubbling.

Furthermore, this arrangement authorizes use of the module for immersed gravity filtration, in particular with minimal chemical cleaning volumes and above all the facility, in an immersed membrane bioreactor, to return the chemical cleaning residues to the pool and thus dilute it and treat it in the pool itself.

It is also clear that this U-shaped arrangement with the bend at the top of the module means that a defective bundle can be taken out of service.

This arrangement also greatly facilitates the fabrication of a large module.

The sheaths are preferably all connected together by pouring a two-component potting resin (in a vertical position which is the reverse of that used in the filtration mode).

For example, the distribution plate is provided with air passages discharging axially between the sheaths. These air passages can be fed radially from the periphery of the distribution plate.

In a preferred embodiment, the casing is closed at the top and sealed by a connection plate having a bore, for example a threaded bore, for connecting a supply of water to be filtered.

The upper part of the casing is advantageously also provided with lifting holes.

BRIEF DESCRIPTION OF THE DRAWINGS

The following description, and the accompanying drawing, explain the objects and advantages of the invention more clearly. It is clear that the description is given by way of example only and has no limiting character. In the drawing.

DETAILED DESCRIPTION OF THE PREFERRED EMBODIMENTS

Figure 2:
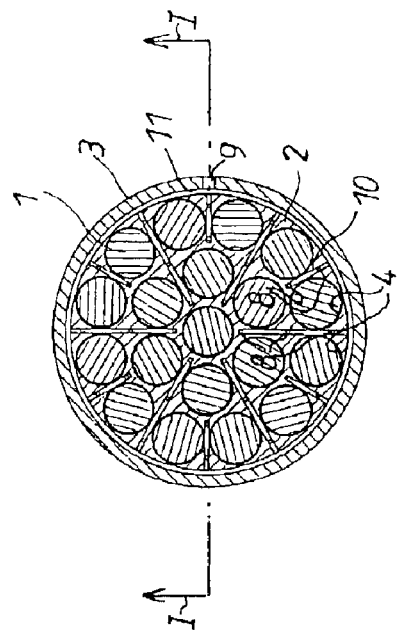
FIG. 2 shows the same installation in cross section taken along the section line II—II in FIG. 1.
Figure 1:
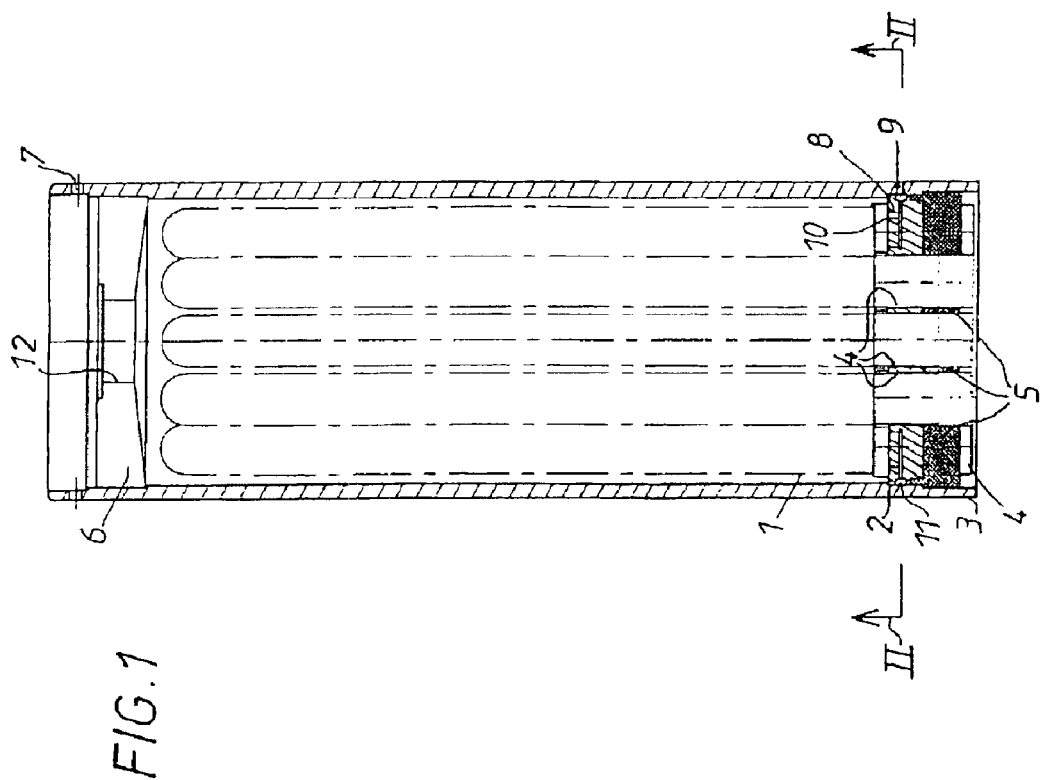
FIG. 1 shows diagrammatically a water filter in accordance with the invention, in longitudinal section taken along the section line I—I in FIG. 2.

As shown in FIG. 1, the filter according to the invention is an ultrafiltration or microfiltration module with hollow fibers, of the type with filtration from the exterior toward the interior of the fibers, with or without backwashing. It is intended to be used, for example, in a water purification installation using a gravity difference as a source of pressure for passing water through the wall of the membranes.

The water to be treated is introduced via the top of the module and the treated water is collected at the bottom of the module.

The fibers are disposed inside a casing 3 in multiple U-shaped bundles 1, the module being disposed vertically in use, with the base of the U-shape at the top of the module. The fibers and bundles therefore form inverted U-shapes.

The casing 3 envelops the hollow fibers disposed in bundles 1 to hold them in the position described. Little space is left, on the one hand, between the bundles, or the branches thereof and, on the other hand, between the bundles and the casing. The fibers are therefore lightly pressed together to retain them and the casing 3 retains the fibers and bundles at the periphery.

The casing is made from a circular cylindrical polyvinyl chloride (PVC) tube. It contains, for example, nineteen bundles 1 of fibers in the embodiment shown in the drawing. Its diameter is then approximately 300 mm for a length of approximately 1 000 mm. These dimensions are given by way of example only.

At the bottom of the module, each bundle 1 is disposed in a sheath 4 and individually potted. The sheaths are then accommodated in a distribution plate 2.

Each sheath 4 takes the form of a circular cylindrical sleeve, for example. The two free ends of the same fiber bent into an inverted U-shape are always in the same sheath. The distribution plate 2 has bores through it whose inside diameter corresponds to the outside diameter of the sheaths 4. A flange is provided at one end of each sheath, on the outside, to limit the sliding of the sheath 4 in the corresponding bore and to enable correct positioning of the sheath 4 relative to the distribution plate 2.

Each sheath is made of polyvinyl chloride (PVC), for example. In the preceding numerical example, the sheaths can have an inside diameter of 52 mm and a height of approximately 100 mm.

Finally, all the sheaths are joined together by pouring a two-component potting resin 5 (in the vertical position that is the reverse of that used in the filtration mode). The resin provides the seal between the high-pressure portion and the low-pressure portion of the filter.

An identical potting resin is used to provide the seal between the fibers of the same bundle 1 in the sheaths 4.

Moreover, the distribution plate 2 is provided with passages 8 for air introduced via a lateral orifice 9 at the bottom of the module. The passages 8 are oriented axially and radial passages 10 connected to a peripheral passage 11 supply them with air from the lateral orifice 9. The air is evacuated in the form of ascending bubbles that agitate the bundles to improve the elimination of filter cake formed on the fibers.

The casing 3 is closed at the top by a connection plate 6. This is mounted on and sealed to the opposite end of the distribution plate 2. A threaded bore 12 at the center of the connection plate 6 is used to connect a pipe (not shown) for supplying water to be treated.

The resulting assembly is a filtration module in which water to be treated is introduced at the top and filtered water is recovered at the bottom. The sealed module forms a filter unit. In addition to many other functions, the casing 3 guides the water to be treated. By delimiting a confined space around the fibers, the casing 3 contributes to the many advantages of the filter described above.

The advantages of this design in use are the multi-bundle disposition that minimizes the problems of poor access to the filtration surface and the difficulty of cleaning the fibers.

Thanks to the U-shaped configuration, there are spaces between the bundles, on the one hand, and in the middle of each bundle, on the other hand.

Moreover, air can be injected between the bundles, the air bubbles flowing mainly tangentially to the bundles.

The configuration of this module:

a) does not deflect the path of the air bubbles which agitate the bundles, b) purges air efficiently from the module, especially on first starting operation, but also when bubbling is effected during filtration, c) does not divert the flow of the filter cake debris evacuated by the bubbles and/or by the backwashing water, d) naturally allows the bundle to form a belly, at around the middle height, which also improves the flow from the exterior to the interior of the bundle (filtration direction) or vice-versa (backwashing direction). In association with the air, this therefore increases turbulence near the bundles, which is favorable from the point of view of limiting clogging, e) avoids (costly) potting at one end, and f) means that, if a fiber breaks, after the defective bundle is identified, it can either be repaired (as is the usual practice), or the incriminated bundle can be taken out of service by fitting a cap glued to the end of the sheath of the bundle, for example.

It is also possible to work with gravity filtration by connecting the connection plate 6 to the water to be treated under pressure.

It is also possible to operate in an "immersed membrane" mode, with the plate 6 not connected. In this case, chemical cleaning can be effected and is limited to filling the module with cleaning solution via the connection plate up to the top. This limits the volume of cleaning solution to the strict minimum, i.e. the volume of the module.

Handling is facilitated by the presence of lifting holes 7 at the top of the module.

Manipulation during fabrication is easy. The individual bundles are sheathed with a flexible elastic film sheath which is used during individual potting of the bundles and removed when the bundle and its sheath are fitted to the distribution plate.

The bundles (in fact their sheaths) are fitted to the distribution plate in a vertical position, with the base of the U-shape at the bottom, after which the combination of the bundles and the distribution plate is introduced into the casing. The whole is then potted.

Potting is simplified because even for large modules (100 $m^2$ filter area and above), there is no utility in carrying out the inevitably complex simultaneous potting of several tens of thousands of fibers. Potting is effected on small individual bundles. Testing each bundle beforehand eliminates the risk of having to scrap a casing and its peripheral components because of a few damaged fibers.

The connection plate 6 is then glued (or welded) into the casing 3.

The air supply system is simple, with no nozzles, which could in any event damage the bundles.

Note that an important advantage of the filter according to the invention is the possibility of injecting air by means of the distribution plate 2, which therefore has several roles.

Moreover, backwashing (by circulating water through the membranes in the reverse direction to clean them) can be effected with water but also with air if the diameter of the pores is sufficient, for example in the case of microfiltration.

Clearly the geometry chosen for the filter according to the invention enables a defective bundle to be identified easily: for example, by injecting air from the untreated water side, with the module in an inverted vertical position and with water on the distribution plate 2, so that bubbles can be seen escaping from the defective bundle.

Consideration can then be given either to plugging the defective fiber or fibers, using conventional means known to the person skilled in the art, or to isolating the entire bundle permanently, for example by gluing on a plug, or reversibly, by fitting a removable plug, pending the simultaneous execution of several repairs.

Plugging one or more bundles of fibers does not interfere in any way with the operation of the module as a whole.

The scope of the present invention is not limited to the details of the embodiments described above by way of example, but to the contrary extends to modifications that will be evident to the person skilled in the art.

For example, instead of U-shaped bundles of fibers, fibers can be used whose upper portion is plugged but free.

What is claimed is:

1. A module for filtration of water from an exterior toward an interior of hollow fibers, said module comprising:
    a casing;
    plural hollow fibers bundled in multiple bundles within said casing, each of said bundles having a closed distal portion and an open proximal portion;
    plural sheaths, each of said bundles being disposed in a respective one of said plural sheaths so that said open proximal portion of each of said bundles is within a respective one of said sheaths such that said multiple bundles are individually potted;
    a distribution plate tightly joined to said casing, each of said individually bundled sheaths being potted in said distribution plate at said proximal portion by a potting resin, said potting resin also forming a seal between said fibers of each respective one of said bundles; and
    an air distribution system within said distribution plate and having plural air passages that extend radially inward, said plural air passages including plural air discharge passages that discharge axially between the sheaths.

2. A module according to claim 1, wherein the fibers are disposed inside said casing in multiple U-shaped bundles, with the branches of the U-shape disposed vertically in use with the base of the U-shape at a top of the module.

3. A module according to claim 1, wherein all the sheaths are interconnected by a two-component potting resin.

4. A module according to claim 1, wherein the casing is closed at the top and sealed by a connection plate having a bore for connecting a supply of water to be filtered.

5. A module according to claim 4, characterized in that the bore (12) for connecting a supply of water to be filtered is threaded.

6. A module according to claim 1, wherein the casing has lifting holes at the top.

7. A module for ultrafiltration or microfiltration of water, comprising:
    a plurality of hollow fibers bundled in multiple bundles that filter from the exterior toward the interior of the fibers, said plural fibers each having a fixed open proximal portion and a free closed distal portion, water to be filtered flowing from said distal portion to said proximal portion;
    a plurality of sheaths, each of said multiple bundles being disposed in a respective one of said sheaths, so that said proximal portion of each of said plural fibers is within a respective one of said plurality of sheaths such that said bundles are individually potted at said proximal portion;
    a distribution plate that positions said plural sheaths at said proximal portion, said distribution plate being structured and arranged so that only water filtered by said fibers crosses said distribution plate;
    an air distribution system within said air distribution plate and having a first air passage that extends around a periphery of said distribution plate and plural second air passages that extend radially inward from said first air passage, said plural second air passages including plural air discharge passages that discharge air axially between the sheaths; and
    a casing enveloping said plural fibers and holding said plural fibers in position at said distal portion, so that said plural fibers are pressed together to retain said plural fibers and the casing retains the bundles at a periphery of said bundles.

8. The module according to claim 7, wherein the distribution plate is circular and comprises a plurality of bores axially therethrough, a respective one of said multiple bundles being within one of said plural bores.

9. The module according to claim 7, wherein said multiple bundles are U-shaped, with branches of the U-shape disposed vertically in use with a base of the U-shape at a water inlet of the module.

10. The module according to claim 7, further comprising a two-component potting resin interconnecting said plural sheaths.

11. The module according to claim 7, further comprising a connection plate adjacent said plural bundles at said distal portion for closing and sealing said casing, said connection plate having a threaded bore for connecting a supply of water to be filtered.

12. A module for ultrafiltration or microfiltration of water, comprising:
    a plurality of hollow fibers bundled in multiple bundles, said plural fibers each having a fixed open proximal portion and a free closed distal portion;
    a plurality of sheaths, each of said multiple bundles being individually potted in a respective one of said sheaths at said proximal portion;
    a distribution plate that positions said plural sheaths at said proximal portion;
    an air distribution system within said distribution plate and having plural air passages that extend radially inward, said plural air supply passages including plural air discharge passages that discharge axially between the sheaths; and
    a casing enveloping said plural fibers and holding said plural fibers in position,
    said plural fibers and said casing being structured and arranged such that said casing delimiting a confined space between said bundles and said casing, so that said plural fibers are pressed together to retain them and said casing retaining the bundles at a periphery of said bundles.

13. The module according to claim 12, wherein water to be filtered flows from a high pressure portion adjacent to said distal portion, inside said plural fibers and then exits at a low pressure portion adjacent said proximal portion.

14. The module according to claim 13, further comprising a potting resin interconnecting said plural sheaths and providing a seal between said high and low pressure portions.

15. The module according to claim 12, wherein a space between adjacent bundles and between the bundles and the casing is structured and arranged so that air bubbles for cleaning flow mainly tangentially.

16. The module as claimed in claim 1, wherein said plural sheaths extend through both ends of said distribution plate.

* * * * *